United States Patent [19]

Tsukahara et al.

[11] Patent Number: 4,988,931

[45] Date of Patent: Jan. 29, 1991

[54] MOTOR DRIVING DEVICE

[75] Inventors: Akihiko Tsukahara; Toshio Iwaoka; Yuichi Yamaguchi; Tsutomu Danzaki, all of Yokohama, Japan

[73] Assignee: Jidosha Denki Kogyo Kabushiki Kaisha, Yokohama, Japan

[21] Appl. No.: 470,502

[22] Filed: Jan. 26, 1990

[30] Foreign Application Priority Data

Jan. 27, 1989 [JP] Japan .................................. 1-19234

[51] Int. Cl.⁵ ............................................. H02P 1/22
[52] U.S. Cl. .................................... 318/293; 318/280
[58] Field of Search ............... 318/280, 287, 288, 289, 318/291, 293, 294

[56] References Cited

U.S. PATENT DOCUMENTS 4,020,361  4/1977  Suelzle et al. .................. 318/599 X
4,447,768  5/1984  Terui ............................... 354/409 X
4,527,103  7/1985  Kade ................................... 318/293
4,544,869  10/1985  Pittaway ............................ 318/293

*Primary Examiner*—Bentsu Ro
*Attorney, Agent, or Firm*—Sughrue, Mion, Zinn, Macpeak & Seas

[57]  ABSTRACT

A motor driving device for rotating a motor in forward and reverse directions which includes a switching circuit arranged in an H-bridge connection with both terminals of the motor, a controlling circuit, and an interception device provided on the respective terminal sides of the motor. The switching circuit includes two sets of switching transistors. The interception device protects the switching circuit by preventing both transistor sets from entering the ON-state at the same time, and thereby prevent the switching means from breaking down.

4 Claims, 1 Drawing Sheet

MOTOR DRIVING DEVICE

BACKGROUND OF THE INVENTION

1. Field Of The Invention

This invention relates to a motor driving device used for driving a motor in the forward and reverse rotational direction.

2. Description Of The Prior Art

Heretofore, there have been various types of motor driving devices which use different circuit formation. One known formation uses the circuit formation shown in FIG. 2 for example.

A motor driving device 101 shown in FIG. 2 has circuit formation comprising a switching part Q1 which is a p-type field effect transistor (hereinafter referred to as "FET") for supplying a current in the forward rotational direction to a motor 102 rotatable in the forward and reverse direction, a switching part Q2 which is a p-type FET for supplying a current in the reverse rotational direction to the motor 102, a switching part Q3 which is a n-type FET for grounding the current in the forward rotational direction through the motor 102, a switching part Q4 which is a n-type FET for grounding the current in the reverse rotational direction through the motor 102, a control means housed in a microcomputer 103 for rotating the motor 102 in the forward and reverse direction by controlling the respective switching parts Q1 to Q4 into an ON-state or OFF-state, a npn-type transistor Tr1 for generating a negative voltage at the gate of switching part Q1, and a npn-type transistor Tr2 for generating a negative voltage at the gate of switching part Q2. Switching parts Q1 to Q4 are connected with both terminals of said motor 102 in H-bridge connection, wherein the switching parts Q1 and Q4 are connected in series between a power source and ground. Switching points Q1 and Q4 are similarly connected in series between power and ground.

The motor driving device 101 is so designed as to drive the motor 102 in the forward or reverse rotation by turning on or off the respective switching parts Q1 to Q4 according to instructions from the control means housed in the microcomputer 103.

However, in the above mentioned motor driving device 101, there is the possibility of some failure in the microcomputer 103 by, for example, overvoltage. If the switching parts Q1 and Q4 or the switching parts Q2 and Q3 are turned into the ON-state at the same time, an excess current flows directly between the power source and the ground through the switching parts Q1 and Q4 or the switching parts Q2 and Q3. Accordingly, there is a problem since the switching parts Q1 to Q4 are in danger of breaking down.

SUMMARY OF THE INVENTION

This invention is made in view of the above mentioned problem of the prior art. It is an object to provide a motor driving device which is possible to prevent the switching means from the breakdown by making one of switching means connected in series with each other into OFF-state when another switching means of said switching means connected in series is in ON-state.

The construction of the motor driving device according to this invention in order to accomplish the above mentioned object is characterized by comprising switching means connected with both terminals of said motor in H-bridge connection and connected in series between power source and ground on either side of said both terminals of the motor, a control means for switching said switching means ON and OFF, and an interception means provided on the respective side of both terminals of the motor for making one of switching means connected in series with each other into OFF-state when another switching means connected in series is in ON-state.

DESCRIPTION OF THE PREFERRED EMBODIMENT

An embodiment of the motor driving device according to this invention will be described below on basis of FIG. 1.

Figure 1:
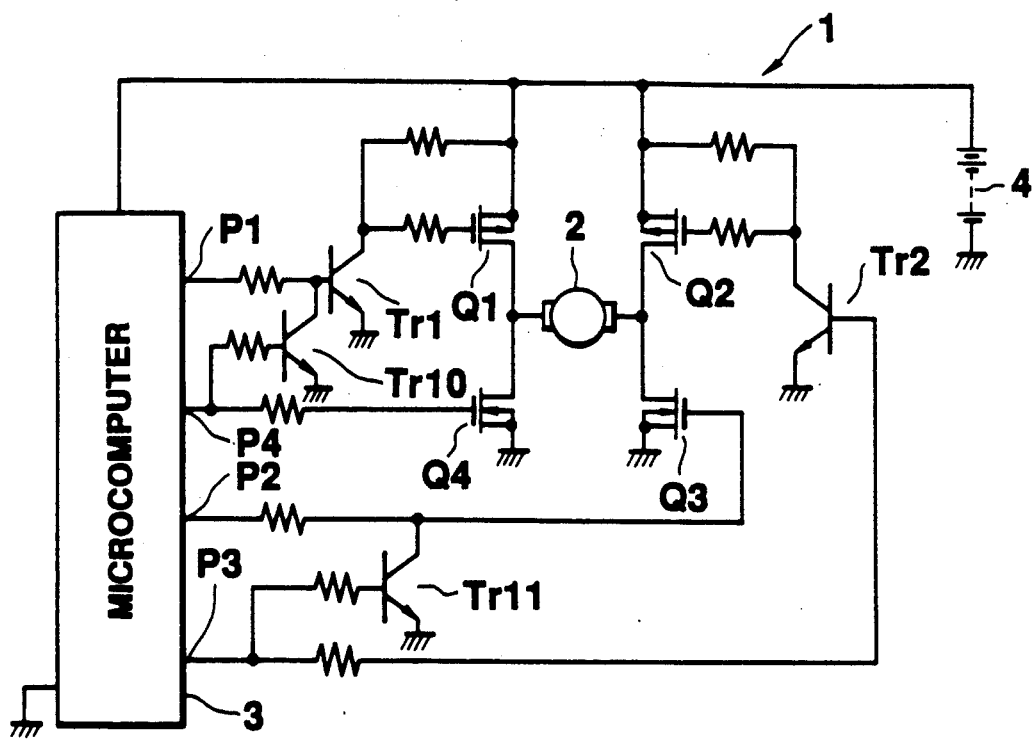
FIG. 1 is a diagram showing the circuit formation of an embodiment of the motor driving device according to this invention.
Figure 2:
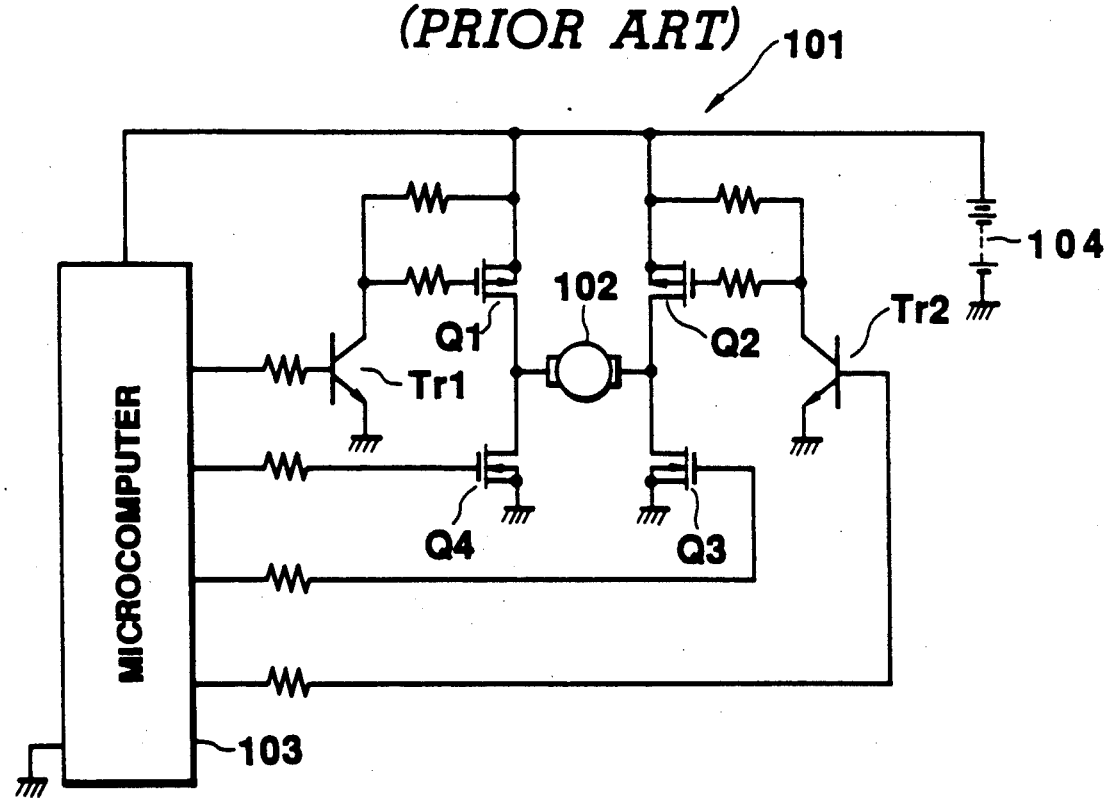
FIG. 2 is a diagram showing the circuit formation of the conventional motor driving device.

FIG. 1 is a diagram showing the circuit formation of an embodiment of the motor driving device according to this invention.

In FIG. 1, numeral 1 is a motor driving device, said motor driving device 1 has circuit formation provided with a switching part Q1 which is a p-type field effect transistor (hereinafter referred to as "FET") for supplying a current in the forward rotational direction to a motor 2 which is rotatable in the forward and reverse direction, a switching part Q2 which is a p-type FET for supplying a current in the reverse rotational direction to said motor 2, a switching part Q3 which is a n-type FET for grounding the current in the forward rotational direction through the motor 2, a switching part Q4 which is a n-type FET for grounding the current in the reverse rotational direction through the motor 2, a control means housed in a microcomputer 3 for rotating the motor 2 in the forward and reverse direction by controlling said respective switching parts Q1 to Q4 into ON-state or OFF-state, a npn-type transistor Tr1 for generating a negative voltage at the gate of said switching part Q1, a npn-type transistor Tr2 for generating a negative voltage at the gate of said switching part Q2, a transistor Tr10 which is a lock-out transistor or an interception means for changing the switching part Q1 its OFF-state by making the base voltage of the transistor Tr1 into "0" when the microcomputer 3 causes gate voltage of the switching part Q4 to become positive. Transistor Tr11 is a lock-out transistor an interception means for changing the switching part Q3 to its OFF-state by making the gate voltage of said switching part Q3 into "0" when the transistor Tr2 functions by the working of the microcomputer 3. Said respective switching parts Q1 to Q4 are connected with both terminals of said motor 2 in H-bridge connection, and respective switching parts Q1 and Q4 on the one side of the terminals of the motor 2 and switching parts Q2 and Q3 on the other side of said terminals of the motor 2 are connected in series between power source and ground.

Next, the function of the motor driving device 1 having afore mentioned construction will be explained.

In the case of rotating the motor 2 in the forward direction, the control means housed in the microcomputer 3 makes an output port P1 into "1" and works the transistor Tr1, which causes the gate voltage of the switching part Q1 to become "0". At one time, the control means housed in the microcomputer 3 makes an output port P2 into "1" and makes the gate voltage of the switching part Q3 into positive. Thereby, said switching parts Q1 and Q3 change to the ON-state and a circuit of "power source 4→switching part Q1 (ON-state)→motor 2→switching part Q3 (ON-state)→ground" is formed and the motor 2 rotates in the forward direction.

In the case of rotating the motor 2 in the reverse direction, the control means housed in the microcomputer 3 makes as output port P3 into "1" and works the transistor Tr2, and so makes the gate voltage of the switching part Q2 into "0". At a time, the control means housed in the microcomputer 3 makes an output port P4 into "1" and makes the gate voltage of the switching part Q4 become positive. Thereby, said switching parts Q2 and Q4 become change to the ON-states and a circuit of "power source 4→switching part Q2 (ON-state)→motor 2→switching part Q4 (ON-state) ground" is formed and the motor 2 rotates in the reverse direction.

Whenever the output from the output port P4 becomes a "1", the transistor Tr10 functions and causes the base voltage of the transistor Tr1 to be into "0". Thereby the switching part Q1 is prevented from entering the ON-state even if the outputs from the output ports P4 and P1 equal a "1" at the same time cause by a control problem of the microcomputer 3.

Furthermore, when the output from the output port P3 becomes a "1", the transistor Tr11 functions and makes the gate voltage of the switching part Q3 into negative, thereby the switching part Q3 is prevented from entering the ON-state even if the outputs from the output ports P2 and P3 equal a "1" at the same time.

Additionally, if the outputs from all of the output ports P1 to P4 equal "1" simultaneously the motor 2 is driven in the reverse rotational direction by the working of said transistors Tr10 and Tr11.

Therefore, the switching parts Q1 and Q4 connected on the one side of the terminals of the motor 2 or the switching parts Q2 and Q3 on the other side of said terminals of the motor 2 never enter the ON-state at the same time, it is possible to prevent the respective switching parts Q1 to Q4 from the breakdown even if the microcomputer 3 is defective.

Although the switching parts Q1 to Q4 which are FET are used as the switching means and the npn-type transistors Tr10 and Tr11 are used as the lock-out transistor or the interception means in the afore mentioned embodiment, the switching means and the interception means are not always restricted to FET and the npn-type transistor.

As mentioned above, the motor driving device according to this invention comprises switching means connected with both terminals of said motor in H-bridge connection and connected in series between power source and ground on either side of said both terminals of the motor, a control means for switching said switching means ON and OFF, and an interception means provided on the respective side of said both terminals of the motor for making one of switching means connected in series with each other into OFF-state when another switching means of said switching means connected in series is in the ON-state. Therefore, it is possible to prevent the respective switching means from the breakdown because the interception means makes one of switching means connected in series to enter the OFF-state even if there is a problem in the microcomputer 3. Accordingly an excellent effect is obtained since it is possible to increase the reliability of the motor driving device by preventing the motor from falling into a uncontrollable state caused by the breakdown of the switching means.

What is claimed is:

1. A motor driving device for rotating a bi-directional electric motor in forward and reverse directions comprising:
    a transfer bridge circuit including first and fourth switching transistors connected in series with each other, and second and third switching transistors connected in series with each other;
    the bi-directional electric motor is connected between a first junction of said first and fourth switching transistors and a second junction of said second and third switching transistors;
    a first NPN transistor having a collector electrode connected to a control electrode of said first switching transistor and an emitter electrode which is grounded;
    a second NPN transistor having a collector electrode connected to a control electrode of said second switching transistor and an emitter electrode which is grounded;
    signal producing means having a first output port connected to a base electrode of said first NPN transistor, a second output port connected to a control electrode of said third switching transistor, a third output port connected to a base electrode of said second NPN transistor, and fourth output port connected to a control electrode of said fourth switching transistor, for supplying output signals to said first and second NPN transistors and said third and fourth switching transistors;
    said motor rotates in a forward direction when said first and third switching transistors are conductive and in a reverse direction when said second and fourth switching transistors are conductive;
    a first lock-out transistor having a collector electrode connected to the base electrode of said first NPN transistor, an emitter electrode which is grounded and a base electrode connected to the fourth output port of said signal producing means, said first lock-out transistor prevents said first switching transistor from conducting when said fourth switching transistor is conducting; and
    a second lock-out transistor having a collector electrode connected to the control electrode of said third switching transistor, an emitter electrode which is grounded and a base electrode connected to the third output port of said signal producing means, said second lock-out transistor prevents said third switching transistor from conducing when said second switching transistor is conducting.

2. The motor driving device as set forth in claim 1, wherein each of said first and second switching transistors comprises a p-type field effect transistor and each of said third and fourth switching transistor comprises a n-type field effect transistor.

3. The motor driving device as set forth in claim 1, wherein said signal producing means comprises a microcomputer.

4. A motor driving device for rotating a bi-directional electric motor in forward and reverse directions comprising;
    a transistor bridge circuit including first and fourth switching transistors connected in series with each other, and second and third switching transistors connected in series with each other;

the bi-directional electric motor is connected between a first junction of said first and fourth switching transistors and a second junction of said second and third switching transistors;

a fifth switching transistor connected to a control electrode of said first switching transistor;

a sixth switching transistor, connected to a control electrode of said second switching transistor;

signal producing means having a first output port connected to a control electrode of said fifth switching transistor, a second output port connected to a control electrode of said third switching transistor, a third output port connected to a control electrode of said sixth switching transistor, and a fourth output port connected to a control electrode of said fourth switching transistor, for supplying output signal to said third, fourth, fifth and sixth switching transistors;

said motor rotates in a forward direction when said first and third switching transistors are conducting and rotates in a reverse direction when said second and fourth switching transistors are conducting;

a first lock-out transistor connected to the control electrode of said fifth switching transistor and fourth output port of said signal producing means, said first lock-out transistor prevents said first switching transistor from conducting when said fourth switching transistor is conducting;

a second lock-out transistor connected to the control electrode of said third switching transistor and third output port of said signal producing means, said second lock-out transistor prevents said third switching transistor from conducing when said second switching transistor is conducting; and wherein said first and second lock-out transistors prevent said first and third switching transistors from conducting and cause said second and fourth switching transistors to conduct when said first, second, third and fourth output ports are supplying the same positive output signal.

* * * * *